Patented Dec. 18, 1934

1,985,201

UNITED STATES PATENT OFFICE 1,985,201

TILE COMPOSITION

Robert D. Bonney, Glen Ridge, and James F. Maguire, South Orange, N. J., assignors to Congoleum-Nairn, Inc., a corporation of New York No Drawing. Application October 26, 1932, Serial No. 639,738

2 Claims. (Cl. 106—22)

The present invention relates to flooring tile, and more particularly to an improved thermoplastic fibrous composition for use as flooring tile.

Mouldable thermo-plastic fibrous compositions have long been known and used in the production of flooring, roofing, and other surfacing products. Such compositions usually comprise an asphaltic binder combined with asbestos or other fibre and various mineral fillers. The product is serviceable but possesses one serious draw-back, namely, that it is virtually impossible of production in light or bright colors, even though excessive amounts of white or light colored pigments are used to mask the dark asphaltic binder. More recently, attempts have been made to employ binders of lighter color such as synthetic resins, vegetable pitch, natural resins, etc. These efforts have, thus far, proven only partially successful, for while the compositions of such binders may be produced in light colors, the physical properties of the resulting products are deficient in one or more respects, rendering the material not wholly satisfactory as flooring tile.

This invention has for its object the provision of an improved flooring tile of a thermo-plastic fibrous composition, having superior qualities of wear-resistance, flexibility, resiliency, toughness, and durability. A further object is the provision of a flooring tile of such composition which is susceptible of production, at low cost, in any desired light color. A still further object is the provision of a flooring tile of such character which is highly resistant to the deteriorating action of water and alkali. A still further object is the provision of a flooring tile characterized by a highly dense and lustrous surface heretofore unknown in this type of product.

The essence of the present invention is to be found in the novel binder discovered and developed, and more particularly in the constituents of such binder and in the manner and proportion in which these constituents are prepared and combined. Briefly, the invention contemplates a flooring tile of a thermo-plastic fibrous composition, comprising, as a binder, a blend of hard paracoumarone resin and polymerized China-wood oil gel, especially prepared and combined. With this binder are incorporated, in predetermined proportions, fibrous material, preferably asbestos fibre, mineral fillers, and pigments.

A typical preferred formula is as follows:—

| | Per cent |
|---|---|
| Binder | 25 |
| Comprising | |
| paracoumarone resin _____ 3 parts | |
| polymerized China-wood oil ____ 1 part | |
| Asbestos fibre | 30 |
| Pigments and mineral fillers | 45 |
| | 100 |

The specific formula may, of course, be varied within moderate limits, depending upon the desired physical properties of the ultimate tile. The binder content should, however, be maintained between 20% and 35%. If the amount of binder is lowered substantially, the compositions become too dry to be worked and sheeted properly. If the percentage is increased, the resultant product is softer and its resistance to indentation is lowered. Likewise, the ratio of paracoumarone resin to the polymerized Chinawood oil is of importance. The preferred ratio, as set forth in the typical example, is three parts of paracoumarone resin to one part of polymerized China-wood oil gel. For satisfactory results the proportion of resin should not be less than two parts, nor greater than four parts, to one part of the polymerized wood oil. The character of the resin is also of importance. Best results will be obtained when employing a resin classified as the standard hard type, having a melting point of 127° C. to 142° C.

The preferred process of forming the thermoplastic composition and of producing flooring tile therefrom, is described as follows: The Chinawood oil is first placed in a kettle and heated to 500 to 520° F. About 15% of the paracoumarone resin is then added, causing the temperature to drop to approximately 450° F. The mixture is again heated to just above 500° F. When this temperature is obtained, heating is discontinued and as soon as polymerization of the oil takes place, the oil-resin gel is dumped into open pans to cool. The prepared gel, together with the balance of the resin, asbestos fibre, mineral fillers, and pigments are charged into a heated kneading machine, such as a Banbury or Pfleiderer mixer. After thorough and intimate mixing, the hot plastic composition is formed into slabs and rolled into sheets of the desired gauge and finish. The sheets are finally cut into tiles of the determined size.

The development, according to the present invention, of a thermo-plastic, fibrous composition, comprising a binder of hard paracoumarone resin and polymerized China-wood oil of the character above described and the compounding therewith of fibrous and mineral fillers in the proportions defined, enables the manufacture of flooring tile having unique properties and advantages. For the most part these unique properties and advantages are attributable to the China-wood oil component, which as especially prepared and polymerized, provides a composition having properties not heretofore obtained. Thus, the product is substantially more resilient than other commercial types of mastic or asphaltic tile heretofore known. Likewise, it is more resistant to indentation, particularly at elevated temperatures. It is susceptible to an unusually smooth finish and high lustre and requires no seasoning. It is extremely tough and capable of withstanding severe mechanical shocks. It is highly resistant to the continued action of water and alkali. Furthermore, and of major advantage, the composition may, with the minimum of pigmentation and corresponding moderate cost, be employed in the production of tile of any desired color. Thus, it is possible to obtain light colors as readily as dark and to have such light colors characterized by unusual cleanness and brightness. With the trend of commercial demand toward such brighter colors, it is obvious that this feature of the present invention is of paramount importance.

While we have pointed out the essential features of the invention and described a preferred embodiment thereof, it will be apparent that certain variations may be made, as indicated, both in the formulation of the composition and in the process of preparing it, without departing from the fundamental teachings of the invention.

We claim,

1. A mouldable composition for flooring tile, comprising 20% to 35% of a binder composed of not less than two parts nor more than four parts of para-coumarone resin and one part of gelled Chinawood oil, and 65% to 80% of filler material, said filler material including asbestos fibre and pigments.

2. A mouldable composition for flooring tile, comprising approximately 25% of a binder composed of three parts of para-coumarone resin and one part of polymerized China-wood oil, approximately 30% of asbestos fibre, and approximately 45% of other mineral fillers including pigments.

ROBERT D. BONNEY.
JAMES F. MAGUIRE.